US012776301B2

(12) United States Patent
Xie et al.

(10) Patent No.: US 12,776,301 B2
(45) Date of Patent: Oct. 27, 2026

(54) SUPPLEMENTAL WORD SELECTION AND INSERTION IN AUTOMATED VOICE CALLS

(71) Applicant: Salesforce, Inc., San Francisco, CA (US)

(72) Inventors: Liang Xie, Los Altos, CA (US); Aaron Chan, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 138 days.

(21) Appl. No.: 18/746,805

(22) Filed: Jun. 18, 2024

(65) Prior Publication Data

US 2025/0384871 A1 Dec. 18, 2025

(51) Int. Cl.

| | |
|---|---|
| ***G10L 13/08*** | (2013.01) |
| ***G10L 15/18*** | (2013.01) |
| ***G10L 15/22*** | (2006.01) |
| ***G10L 15/30*** | (2013.01) |

(52) U.S. Cl.

CPC .......... *G10L 13/08* (2013.01); *G10L 15/1815* (2013.01); *G10L 15/22* (2013.01); *G10L 15/30* (2013.01)

(58) Field of Classification Search

CPC ..... G10L 13/08; G10L 15/1815; G10L 15/22; G10L 15/30

See application file for complete search history.

(56) References Cited

U.S. PATENT DOCUMENTS 11,843,719 B1 * 12/2023 Liu .................... H04M 3/5175
2014/0058732 A1 * 2/2014 Labsky .................. G10L 15/30 704/E15.005
2015/0112665 A1 * 4/2015 Kim ...................... H04W 4/14 704/9
2015/0206531 A1 * 7/2015 Fujisawa ................ G10L 15/22 704/251
2015/0206532 A1 * 7/2015 Fujisawa ................ G10L 15/22 704/251
2022/0038398 A1 * 2/2022 Zhou .................... H04M 3/527
2022/0092131 A1 * 3/2022 Koukoumidis ... G06F 16/90335
2022/0245362 A1 * 8/2022 Nizar .................... G06N 20/00
2022/0286732 A1 * 9/2022 Hausmann .......... G10L 15/1822
2024/0378427 A1 * 11/2024 Petrov .................. G06F 40/284
2024/0395246 A1 * 11/2024 Mcquinn ................ G10L 13/02
2024/0396856 A1 * 11/2024 Chen ..................... G06V 10/40

OTHER PUBLICATIONS

Garg, S., & Ramakrishnan, G. (2020). BAE: BERT-based adversarial examples for text classification. arXiv preprint arXiv: 2004.01970. (Year: 2020).*

* cited by examiner

*Primary Examiner* — Philip H Lam

(74) *Attorney, Agent, or Firm* — Kwan & Olynick LLP

(57) ABSTRACT

A method receives audio data from a call. Services are performed to process the audio data to automatically generate a response, wherein the services include converting the audio data to input text, inputting the input text into a model to automatically generate a text response, and converting the text response to an audio response. Supplemental words are selected based on the input text. The method determines a type of service based on services performed to generate the audio response and determines a position in the response to insert the supplemental words based on the type of service. The supplemental words are provided for insertion in the call at the position to supplement the audio response.

20 Claims, 9 Drawing Sheets

SUPPLEMENTAL WORD SELECTION AND INSERTION IN AUTOMATED VOICE CALLS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to telecommunication systems and more specifically to automated voice calls.

BACKGROUND

Automated voice calls may use artificial intelligence to automatically participate in voice calls with users. For example, some service providers may have a daily work routine, that is, to make a large number of voice calls to explore new opportunities or service current users'. If automated voice calls can be used, the workload may be significantly reduced. However, an automated voice call may include many challenges. For example, the recipient of the call may not feel like the recipient is talking to a real person, and the service provider might lose business opportunities.

BRIEF DESCRIPTION OF THE DRAWINGS

The included drawings are for illustrative purposes and serve only to provide examples of possible structures and operations for the disclosed inventive systems, apparatus, methods and computer program products for automated voice calls. These drawings in no way limit any changes in form and detail that may be made by one skilled in the art without departing from the spirit and scope of the disclosed implementations.

DETAILED DESCRIPTION

System Overview

Figure 1:
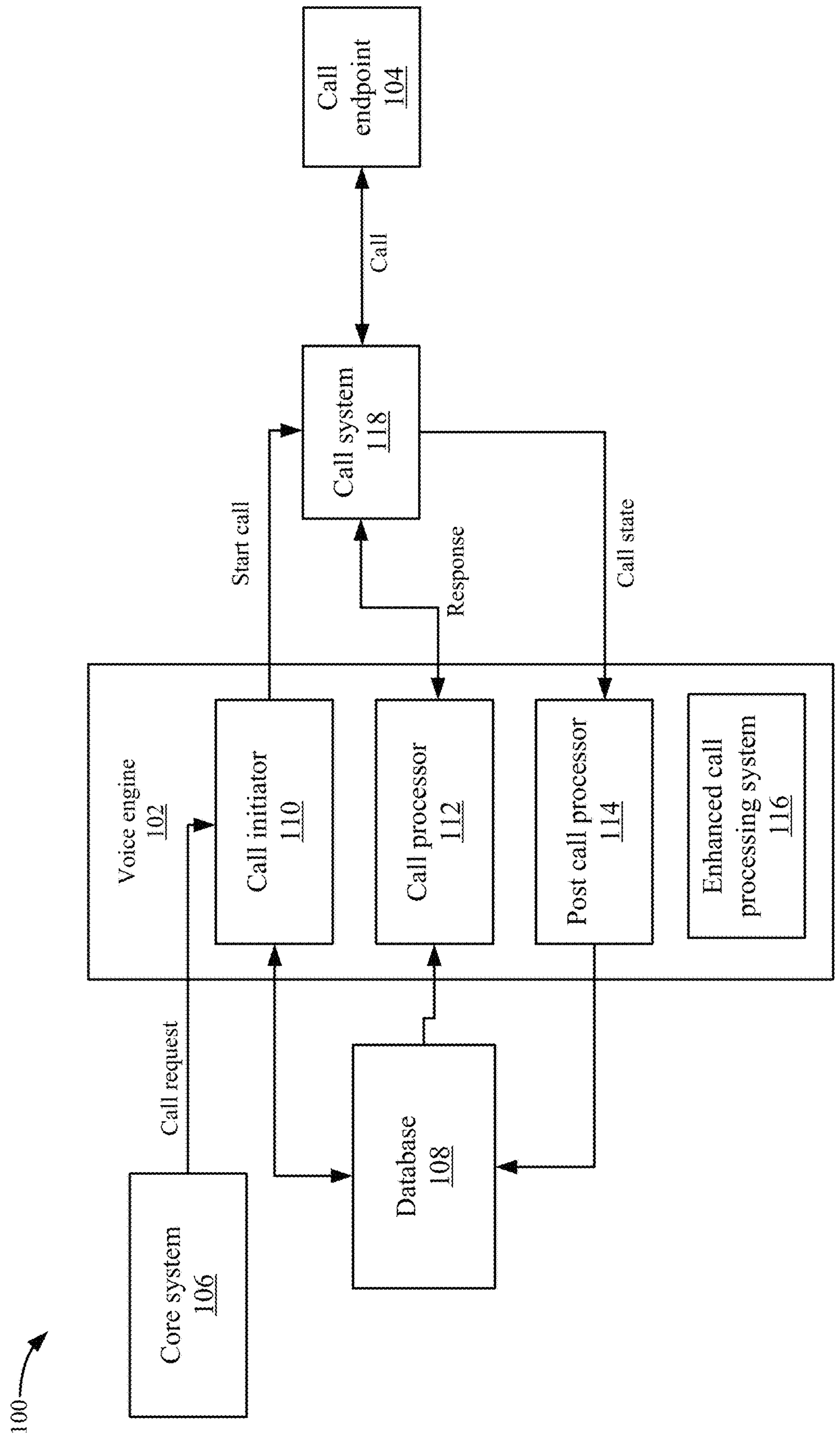
FIG. 1 depicts a simplified system for processing a voice call using supplemental words according to some embodiments.

A system may participate in automated calls with call endpoints. The system may use a model, such as a large language model, to participate in a conversation with a user that is using the call endpoint. The model may generate audio data (e.g., speech) during the conversation. The generation of audio data may require low latency, monitoring, and intervention. For example, the time duration between a user's question or statement and the reply from the model should be short, such as a few seconds of wait time may be too long and feel unnatural to the user. Also, the system may have to monitor the ongoing voice call with the user to determine whether intervention is needed in the conversation. For example, the user may have a question that needs more elaboration or immediate actions from a human user or some language generated by the model may need to be altered.

The system improves the automated voice call by adding supplemental words during the conversation. In some embodiments, the supplemental words may be filler words that may be simple words such as "um," "uh," "hmm," "like," "you know," and "all right," etc. Also, the supplemental words may be short filler word sentences such as "I agree with you, um . . . ," "sorry to hear that, um . . . ," and "okay, let me check, and . . . ," etc.

The supplemental words may be added at different times during the voice conversation. For example, supplemental words may be added to the beginning of a response sentence. Also, the supplemental words may be added to different places in a response, which may be referred to as niceties. For example, supplemental words may be inserted into the middle of a sentence. Also, the supplemental words may be added in between sentences, at the end of the response, etc.

The use of supplemental words may improve the automated voice conversation. For example, the insertion of supplemental words may make the voice conversation more natural and mask out any delay that is caused in the voice processing steps being performed by the system. For example, it takes time to convert speech to text, generating a response using the model may take time, there may be time needed to verify the response, and also the response is converted from text to speech. The insertion of supplemental words during those times may mask the delay. Also, human voice conversations may intermittently include times where humans are thinking while talking. The use of supplemental words may mimic the real human conversations.

The insertion of the supplemental words may also be improved. For example, the supplemental words may be added according to different needs, such as different types of delays. In some examples, the supplemental words may be short-sentence filler words that may cover longer delays. For example, when the model generates a long response and the system needs to wait until the entire response is generated for verification, a longer supplemental sentence may be inserted in the delay. However, if the response sentence is short, a simple filler word or two may be more appropriate. The system may analyze the voice conversation and the services that may be provided, and use the most appropriate supplemental words during the voice conversation. Also, when a voice conversation is being held, the automated insertion of supplemental words is faster and required to maintain a flow of the voice conversation. If a human user is injected into the automated voice conversation, there may be delay in adding the human user, and the responses may be slower. Additionally, the call is not automated anymore and resources are wasted.

System

FIG. 1 depicts a simplified system 100 for processing a voice call using supplemental words according to some embodiments. System 100 includes a voice engine 102, a core system 106, a call endpoint 104, a database 108, and a call system 118. Although these entities are described, other entities may be included. Also, functions described may be performed or distributed among different entities. For example, functions of call system 118 may be performed by voice engine 102 or by a separate system.

Core system 106 may be a system that is being used to initiate requests for calls. In some embodiments, core system 106 may be a customer relationship management (CRM) system. For example, the customer relationship management system may be a business development representative system that automatically reaches out to users via communications, such as phone calls (e.g., voice calls), emails, or messaging, to discuss opportunities and develop relationships. Although a business development representative system and customer relationship management system are discussed, the processes described may be used in different systems that require automated voice calls.

Call endpoint 104 may be a device that receives a voice call. In some embodiments, call endpoint 104 may be a client device, consumer device, smartphone, etc. A user may be using call endpoint 104.

Call system 118 may be a system that provides the physical connection and signaling for the call to call endpoint 104. Call system 118 may provide a connection to call endpoint 104 via network, such as a public switch telephone network connection. Call system 118 may also connect to voice engine 102 using a streaming architecture. Voice engine 102 may initiate the call, process the call to provide a response to insert in the call, and also analyze the voice conversation to determine supplemental words to insert in the response. Voice engine 102 may thus provide an automated call using artificial intelligence, which may be referred to as an automated bot call. The responses to the voice call may be automated without human intervention. Although this system is described, other systems may be used. For example, instead of a voice call, text messages from call endpoint 104 may be received and text responses are automatically generated.

A call initiator 110 in voice engine 102 may receive a call request from core system 106. Call initiator 110 may access data from database 108 that is required to start the voice call, such as a phone number, name of the company, the user's phone number, and user's name. Call initiator 110 sends a message to start the call with the information to call system 118. Then, call system 118 may initiate the call between call system 118 and call endpoint 104. Also, call system 118 may initiate a connection between call system 118 and call processor 112. For example, an audio data input/output connection is established between a server endpoint (e.g., web socket endpoint) in call processor 112 and call system 118. Call processor 112 is able to receive audio data from the streaming connection and provide a response of audio data in the voice call between call system 118 and call endpoint 104. A voice conversation between a user of call endpoint 104 and call system 118 may then occur.

Call processor 112 may use enhanced call processing system 116 during the call. Enhanced call processing system 116 may determine supplemental words and when to insert the supplemental words into the voice call. Call processor 112 may provide different services during the voice call. For example, as will be described below, call processor 112 may interact with a model to analyze requests or statements from call endpoint 104, and generate responses. This process will be described in more detail below.

A post-call processor 114 may perform services after the call ends. For example, call system 118 may send a call state to post-call processor 114. Then, post-call processor 114 may perform a service, such as saving a transcript of the voice call and audio recording to database 108. Also, post-call processor 114 may save the supplemental words that were inserted into the voice call. This information may be used to train the generation of supplemental words for future voice calls.

Call Processor

Figure 2:
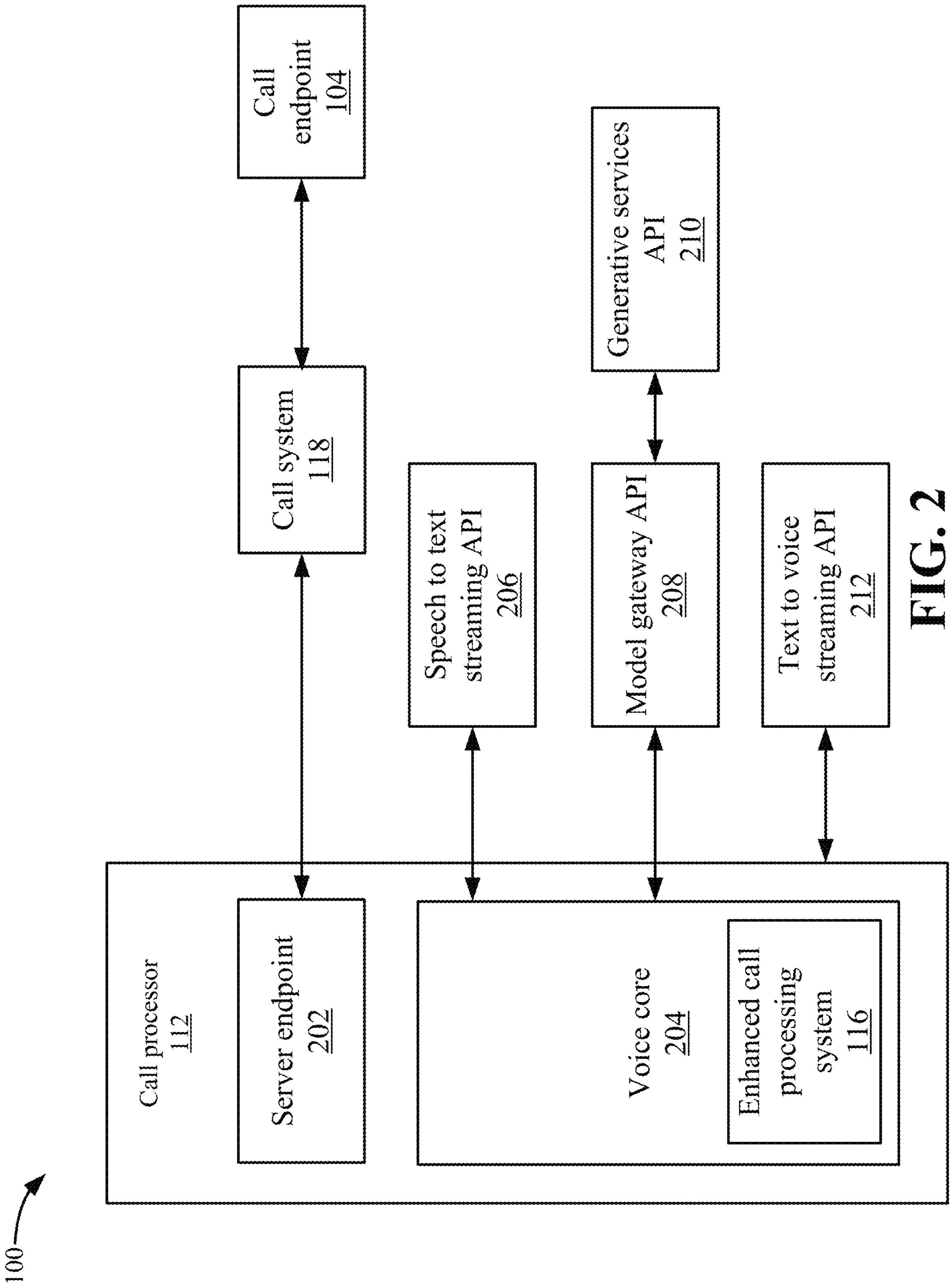
FIG. 2 depicts a more detailed example of a call processor according to some embodiments.

FIG. 2 depicts a more detailed example of call processor 112 according to some embodiments. Call processor 112 includes a server endpoint 202 that may be a web socket endpoint to connect to call system 118 during the voice call. Server endpoint 202 may receive audio data and be an interface with voice core 204. Voice core 204 is able to receive the audio data from the voice call and also provide playback audio data for insertion into the voice call.

Voice core 204 may include enhanced call processing system 116, which may interact with various services that may be used to generate responses in the voice call. For example, voice core 204 may use different interfaces, such as a speech-to-text streaming application programming interface (API) 206, a model gateway API 208, a text-to-voice streaming API 212, and a generative services API 210 to access services. Other services may also be appreciated.

Speech-to-text streaming API 206 may be an interface to a service that converts audio data from the voice call into text. The text is then returned to voice core 204.

Model gateway API 208 may be an interface to a model that analyzes the text of the voice call, and generates a response. In some embodiments, a large language model may be used to analyze the text and generate a response. Different large language models may be used to generate the response. The large language model may be a generative artificial intelligence system that can generate responses in human-like text.

Model gateway API 208 may call generative services API 210 to have services performed when interacting with the model. Generative services API 110 may be an interface to services that may need to be performed on input to the model or responses generated by the model. Although generative services API 110 is shown being connected to model gateway API 208, it may be used for other services, such as in speech-to-text conversion or text-to-speech conversion. One generative service may be a privacy check that may mask sensitive information that should not be sent to services, such as the model. A toxicity check may analyze the responses to make sure undesirable information is not included in the response, such as inappropriate words. In some examples, before text is sent to the model, a privacy check is used to mask sensitive information. Sensitive information may be any information that should not be sent to a service, such as real names, account numbers, etc. Then, the masked text is sent to the model. Also, when the response is received, the privacy check may insert the sensitive information back into the response. Also, the toxicity check may perform a verification that the response includes appropriate information. For example, the toxicity check generates a toxicity score that rates a probability that the content of the response includes inappropriate information. Based on the verification, some information may be filtered or changed in the response. The altered response may then be returned to enhanced call processing system 116. Then, text-to-speech streaming API 212 may be used to send the text response to a text-to-speech conversion. A text-to-speech service may convert the text response to audio data such that server endpoint 202 can provide in the call. For example, the audio data is returned to call system 118. Then, call system 118 sends the audio data (e.g., speech) to call endpoint 104 in the voice call.

Each of the services above may take some time to complete. For example, the speech-to-text conversion may take around one second, the text-to-speech conversion may take around one second, the response generation by the model based on the input may take around one second, and the privacy check and verification of the response may take around three to five seconds. If these delays occur as silence in the automated voice call, the user of call endpoint 104 may not have a satisfying experience with the call, and may even end the call.

There may be some challenges in the processing to generate a response. For example, some services may support streaming. That is, the data sent to a service or received from a service may be streamed. For example, the audio data may be streamed to a speech-to-text service, which can process the audio data as it is received. However, some generative services, such as the verification, may not support streaming. For example, a complete sentence or the complete text to be verified may be needed to perform the verification by the toxicity check. Also, the masking of sensitive data may a require a complete sentence or the entire text before masking. That is, the masking of sensitive data may have to wait until the entire input for the model is received to perform masking or the entire response from the model is received to perform unmasking. Also, the toxicity check may have to be applied on a completely de-masked response. That is, the privacy check and toxicity check may have to be executed in a serial manner. For example, the privacy check needs to be performed before the toxicity check is performed. The above challenges may result in delays in providing a response, which may result in unnatural silences in the voice call. The following will now describe how to improve the voice call by determining supplemental words and determining where to insert the supplemental words in the voice call.

Supplemental Words

Figure 3:
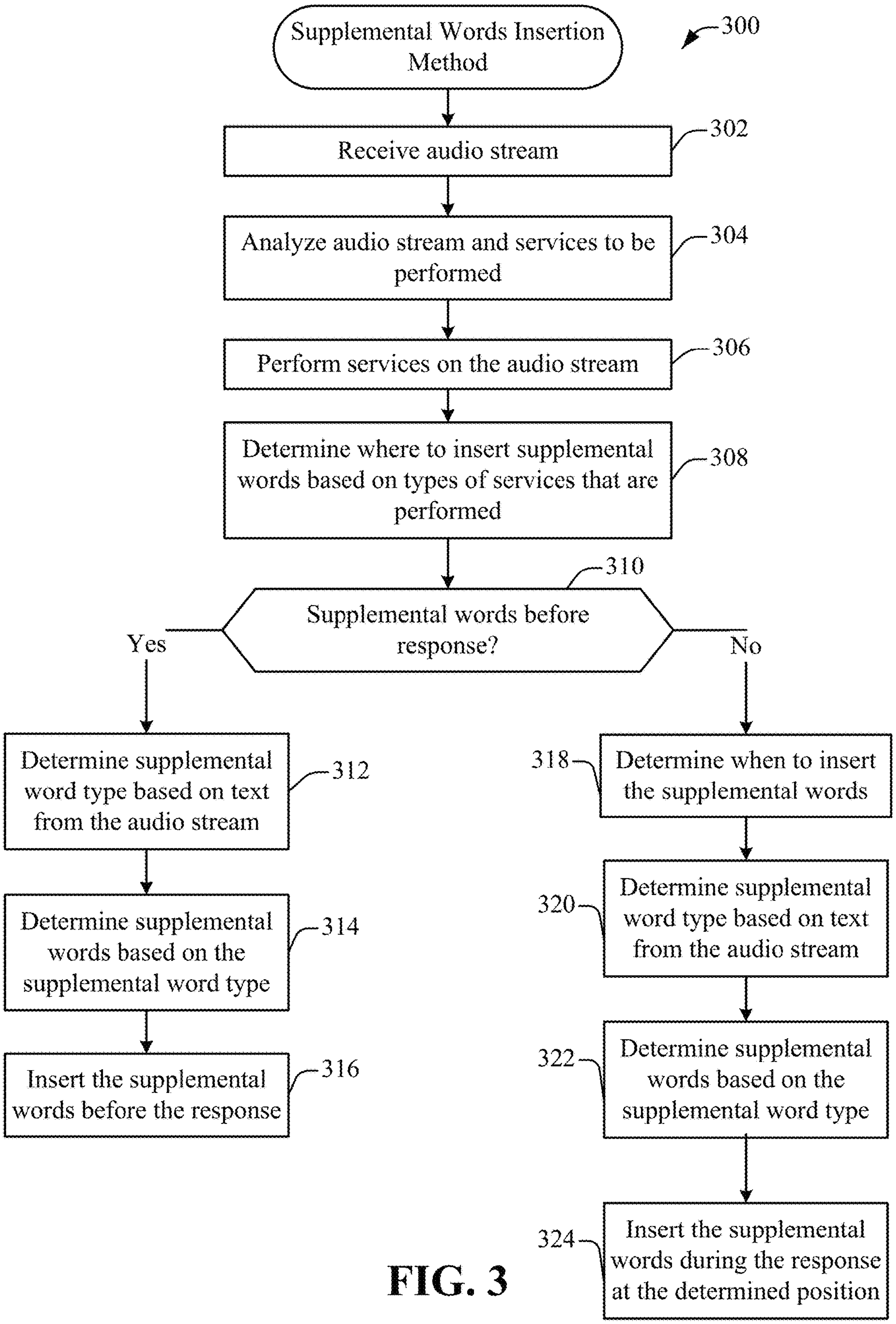
FIG. 3 depicts a simplified flowchart of a method for generating supplemental words and inserting the supplemental words in a response according to some embodiments.

FIG. 3 depicts a simplified flowchart 300 of a method for generating supplemental words and inserting the supplemental words in a response according to some embodiments. At 302, enhanced call processing system 116 receives an audio stream. For example, the audio stream is received from server endpoint 202. Then at 304, enhanced call processing system 116 analyzes the audio stream and determines services to be performed. For example, enhanced call processing system 116 may determine which services need to be performed, such as a speech-to-text conversion, a text-to-speech conversion, generative response generation, generative services, etc. In some embodiments, the services to be performed may be based on a state of the voice call, such as the speech-to-text conversion needs to be performed first, then generative services, etc. This process may be performed for each service that is performed. At 306, enhanced call processing system 116 performs services on the audio stream.

During the performing of the services, at 308, enhanced call processing system 116 determines where to insert supplemental words. Supplemental words may be placed in different positions in the response. For example, the positions may be before the response or can be during the response, such as in between sentences or within a sentence. In some embodiments, different positions may be appropriate. The insertion of supplemental words before the response may be used to mask out delays. Also, the insertion of supplemental words in the middle of a response, such as in between sentences or within a sentence may be used to make the response sound more natural or mask delays. The supplemental word response in the middle of the response may be performed in different ways, such as using a uniform distribution such as a supplemental word every 30 words or so, increasing the probability for a supplemental word insertion as the duration increases for the response, or other methods may be used to determine the position. Enhanced call processing system 116 may increase the likelihood of inserting niceties incrementally. For example, if a nicety word is just inserted, then the next word will have 1 out of 30 chance of having another nicety word inserted. If a nicety is not inserted, then the next word will have 2 out of 30 chance of getting another nicety word inserted. Then the likelihood goes to 3 out of 30, 4 out of 30, all the way up to the 30th word, which has 30 out of 30 (e.g., 100% chance) of having a nicety word inserted. Thus, a nicety word is inserted at least once every 30 words, but it may be randomized so that it can be inserted anywhere between the 1st and the 30th word. This process provides some randomness so it sounds more natural and humanlike. The type of service may also be used to determine where to insert the supplemental words. For example, a longer delay that may result from generating a response may require insertion of supplemental words during the response. Also, a short delay caused by text-to-speech conversion may require a short filler word to be inserted before the response. When different services are being performed, enhanced call processing system 116 may determine different positions to insert the supplemental words. In some embodiments, enhanced call processing system 116 may use the following limitations and guidelines to determine position. A first limitation does not add a supplemental word before the last word of a sentence. A second limitation does not add a supplemental word after the end of a sentence. A first guideline can add a supplemental word before the beginning of a sentence. A second guideline can add a supplemental word before a word that contains preposition. A third guideline can add a supplemental word after a word that contains coordinating conjunctions, such as For, and, nor, but, or, yet, so, etc. Using these limitations and guidelines may reduce some overhead of the system and improve the speed of the decision making. The limitations and guidelines are examples and are not limited to being used.

At 310, enhanced call processing system 116 determines whether to insert supplemental words before the response. If the supplemental words are to be inserted before the response, at 312, enhanced call processing system 116 determines a supplemental word type from the text of the audio stream. There may be different types of supplemental word types. The supplemental word type may be determined by detecting the basic intent of the voice call, such as the request from a user. In some examples, enhanced call processing system 116 may determine the intent after the speech-to-text conversion, but before the model generation response. In some examples, if a user asks a question, there may be filler words that may be used when responding to the question such as, "hmm, let me think . . . ," or "got it, let me check . . . ", enhanced call processing system 116 may detect a question based on the text, such as the presence of a question mark, "?" sentences starting with words that typically are associated with the questions such as, “when”, “how”, “why”, “where”, “is”, “are”, etc. Further, enhanced call processing system 116 may analyze the entire sentence to determine whether a question is being asked.

Another supplemental word type may be if a user is making a statement. For example, if a statement is being made, there may be a positive statement, enhanced call processing system 116 may insert supplemental words such as “agreed, um . . . ”, or a negative statement may be inserted, such as “sorry to hear that, um . . . ”. Enhanced call processing system 116 may detect the statement based on analyzing the text, such as determining that sentences do not contain question marks or sentences do not start with when, how, why, where, is, are, etc. Also, entire sentences may be analyzed to determine whether statements have been made.

Another type of supplemental word may be used when a user sounds like they are using a raised voice or the user has a negative connotation. Supplemental words for this type may be, “I apologize, uh . . . ”. Enhanced call processing system 116 may detect this type using text or speech. For example, enhanced call processing system 116 may scan the text for symbols that indicate higher degrees of emotion, such as an exclamation mark, or “are you serious . . . ” or “seriously?”. Also, enhanced call processing system 116 can analyze the speech (before it is converted to text) to detect the tone or raised voice, which can predict the user’s current sentiment towards the call.

The type of service may also be used to determine the supplemental word type. For example, enhanced call processing system 116 may monitor latency, which may be measured based on the time difference between the time when the transcript is sent to model gateway API 208 and the time when a final result from model gateway API 208 is received. Enhanced call processing system 116 may compare the latency to a threshold to determine whether this sentence has a long delay or not. Enhanced call processing system 116 determines whether to insert a filler word or a filler sentence (the sentence may be determined based on intent). Enhanced call processing system 116 can insert the supplemental words before sending the result to do text-to-speech and audio playback. A longer delay that may result from generating a response may require a longer statement, such as “let me help you with . . . ”. Also, a short delay may require a short filler word, such as “uhhh”.

At 314, enhanced call processing system 116 determines the supplemental words based on the supplemental word type. For example, there may be multiple words associated with each type. Enhanced call processing system 116 may use a random approach that selects from a supplemental word in the type. Also, enhanced call processing system 116 may analyze the text of the response to determine an appropriate supplemental word within the type. For example, if simple words such as “um”, “ah”, “hmm”, “like”, “you know”, etc. are available, enhanced call processing system 116 may randomly select one of them, or may select words that have not been used recently to make sure different supplemental words are used. At 316, enhanced call processing system 116 inserts the supplemental words before the response.

If the supplemental words are not inserted before the response, at 318, enhanced call processing system 116 determines when to insert the supplemental words. The insertion may be based on different factors, such as a uniform distribution, or analysis of the response to determine where a supplemental word would be most effective, such as between sentences.

At 320, enhanced call processing system 116 determines a supplemental word type from the text of the audio stream. The determination may be similar to described at 312.

At 322, enhanced call processing system 116 determines supplemental words based on the supplemental word type. For example, a random selection of supplemental words from the type may be performed. Also, enhanced call processing system 116 may analyze the text of the response to determine which supplemental word may fit best between the text before the insertion or the text after the insertion. At 324, enhanced call processing system 116 inserts the supplemental words during the response at the determined position.

Figure 4:
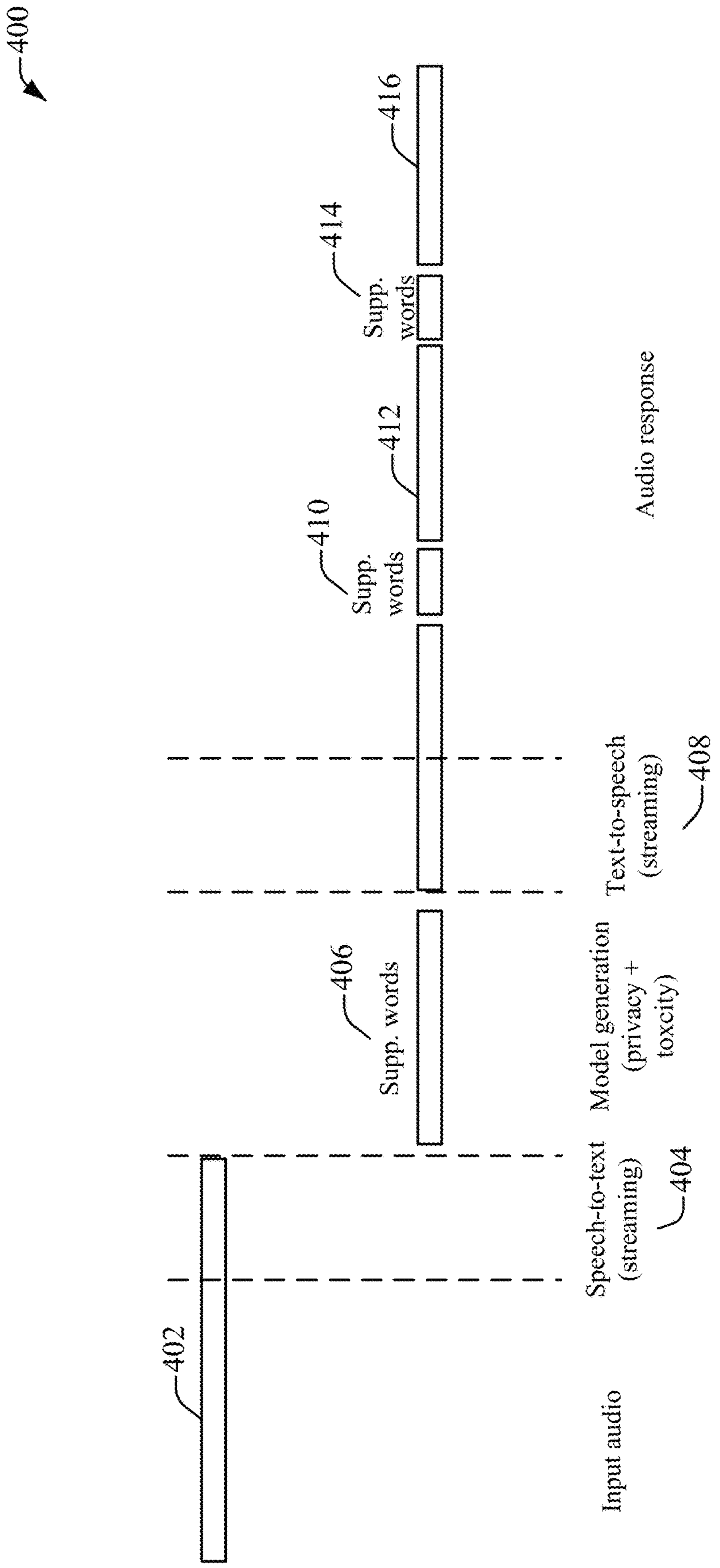
FIG. 4 depicts a timeline for inserting supplemental words according to some embodiments.

FIG. 4 depicts a timeline 400 for inserting supplemental words according to some embodiments. At 402, enhanced call processing system 116 may receive an input sentence in the voice call. At 404, speech-to-text conversion is performed, which may be streamed. This may result in a delay of around one second. At 406, supplemental words may be inserted before the response. This may be before the model generates a response and also when generative services are performed, such as privacy and toxicity checks. This may be a delay of four to six seconds in which longer sentence like supplemental words are inserted.

At 408, text-to-speech service is performed, which can be streamed. During this period, the streamed speech that is converted may be sent to a server endpoint 202 for insertion in the voice call. A short filler word may be inserted during this time if needed.

At 410, supplemental words may be inserted in the response that is being streamed. These supplemental words may be niceties that may make the conversation more human-like. At 412, after the insertion of the supplemental words, the response may continue. At 414, another supplemental words may be inserted. For example, after 30 or more words in the response, more supplemental words may be inserted. Then, at 416, the response continues.

Generative Services

Figure 5:
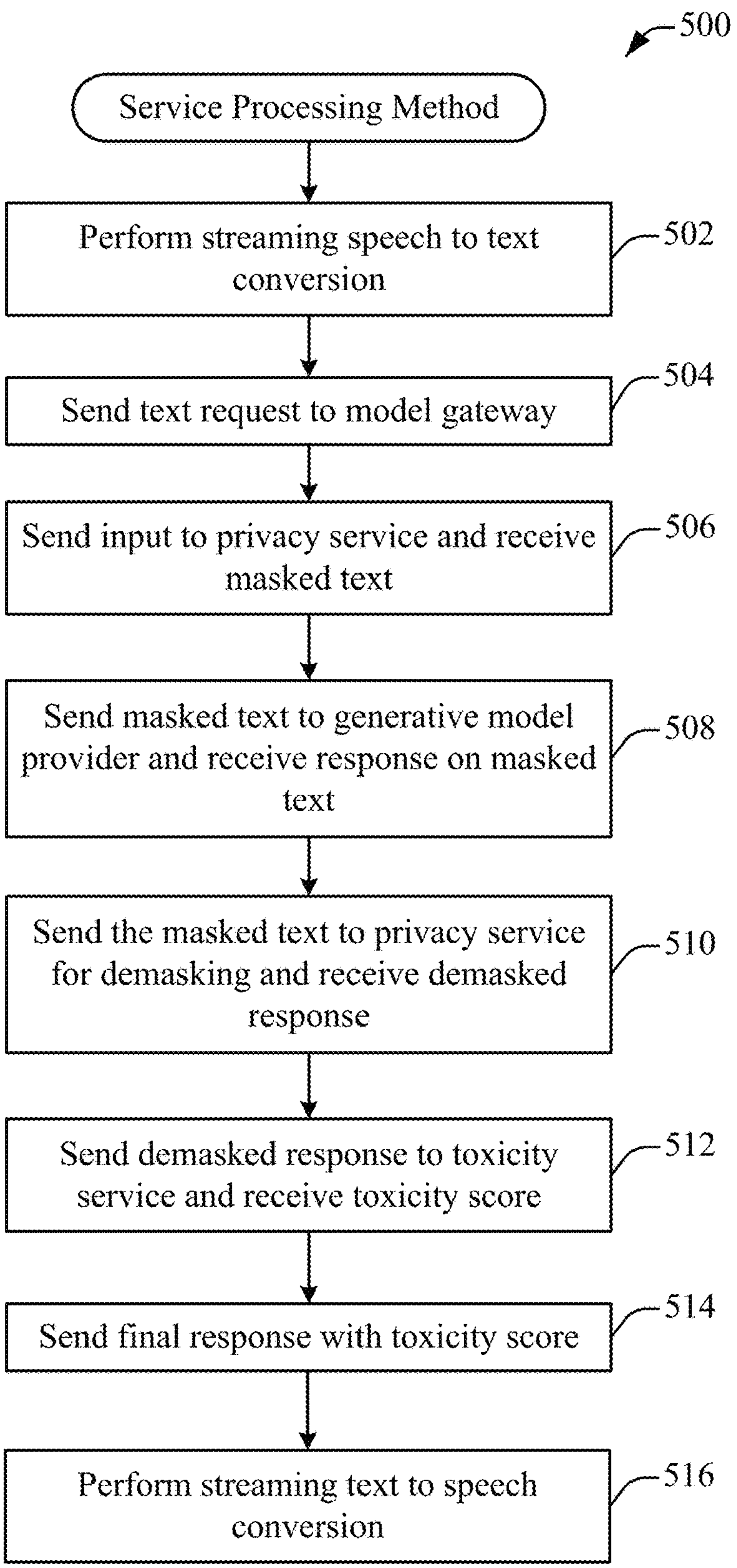
FIG. 5 depicts a simplified flowchart of different services that are performed and supplemental words that can be used according to some embodiments.

As described above, when the different services are performed during the call processing, some services may be streamed and some services may need to wait for the entire input or a complete sentence and cannot be streamed. Streaming may mean that the service can be performed without requiring the entire set of information, such as words from text or audio data. Services that cannot be streamed need to wait for an entire sentence or the entire input that is required for processing. FIG. 5 depicts a simplified flowchart 500 of different services that are performed and supplemental words that can be used according to some embodiments.

At 502, enhanced call processing system 116 performs a streaming speech-to-text conversion. In this case, as audio data is received, enhanced call processing system 116 can have the audio data converted as it is received. In this case, enhanced call processing system 116 may determine that a supplemental word, such as a simple word, may be inserted before the response since the conversion is performed as audio data is received.

At 504, enhanced call processing system 116 sends the request to model gateway API 208. Services may be accessed through model gateway API 208 that do not support streaming. For example, the privacy check may need to mask text and a toxicity check may need to determine a toxicity score using input that does not support streaming, such as an entire sentence or entire input needs to be analyzed to properly perform the check. The toxicity score may rate a probability that the response includes undesirable information. In this case, at 506, model gateway API 208 sends input to a privacy check and receives masked text back. For example, sensitive information, such as names, may be masked in the input.

At 508, model gateway API 208 sends the masked text to a generative model provider and receives a response on the masked text. For example, the response may include masked response text.

At 510, model gateway API 208 sends the masked response text to the privacy check for de-masking and receives the de-masked response. For example, sensitive information may be reinserted into the response. Then, at 512, model gateway API 208 sends the de-masked response to a toxicity check and receives a toxicity score. In some embodiments, the toxicity check needs to be performed on a de-masked response. At 514, model gateway API 208 sends a final response with the toxicity score to enhanced call processing system 116. Enhanced call processing system 116 may use the toxicity score to determine whether to adjust the response, such as adjusting or removing words from the response. The steps taken at 504-514 may need to wait until an entire sentence is received or the entire text that should be analyzed. This may take four to six seconds to perform.

In some examples, the masking and de-masking of sensitive data may have to wait for the entire input and the entire response from the model. The toxicity scoring may be applied on a sentence-by-sentence basis that has been de-masked. The privacy check and the toxicity service have to be executed serially. Due to this long period of four to six seconds, enhanced call processing system 116 may determine that short sentences should be inserted as supplemental words. For example, a short sentence of, "okay, let me check . . . ". may be inserted here.

At 516, enhanced call processing system 116 performs streaming text-to-speech conversion. The text-to-speech conversion may be performed as text is received. This may be a short period of time and enhanced call processing system 116 may determine that a simple word may be inserted during this time, such as "um."

Figure 6:
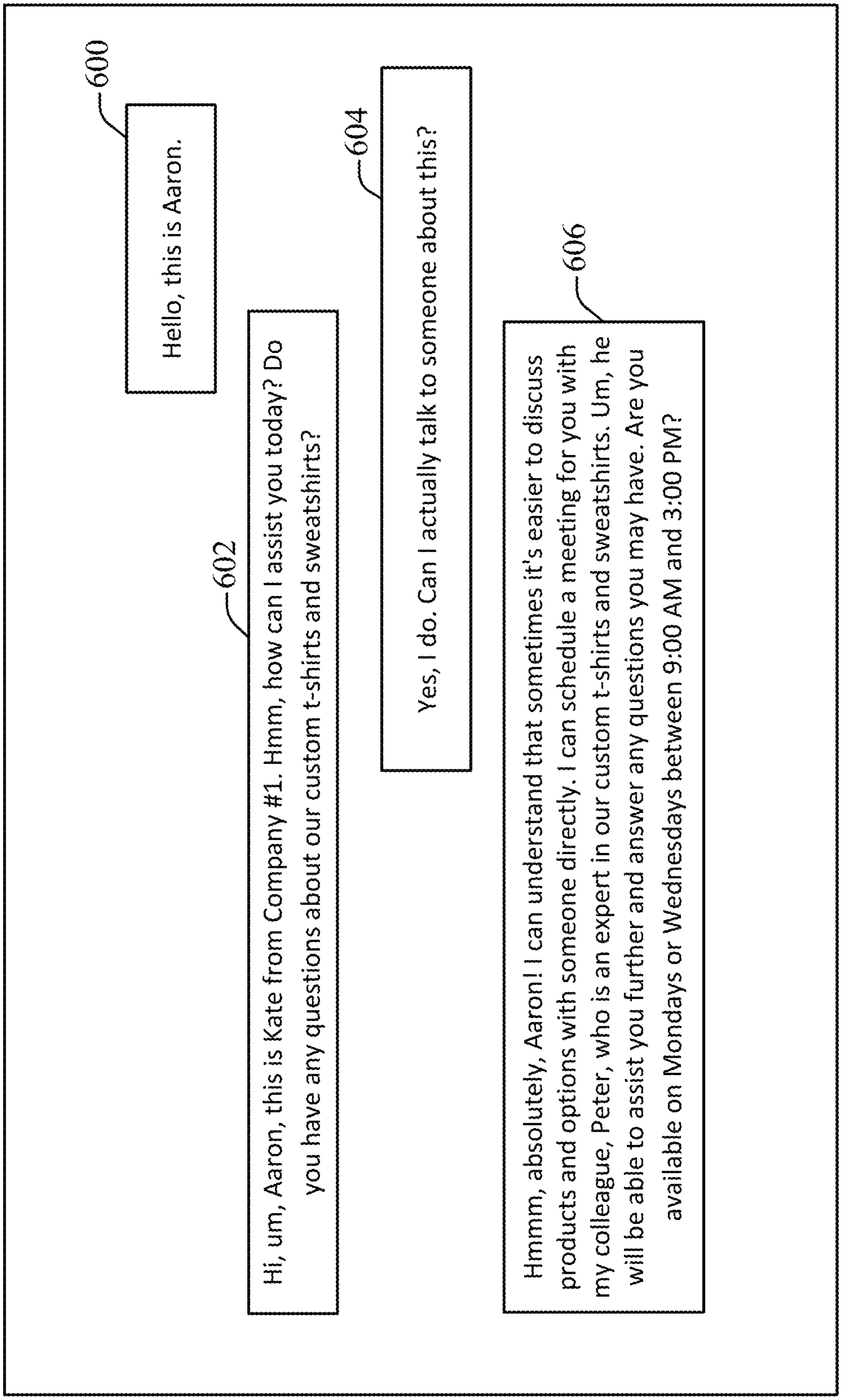
FIG. 6 depicts an example of a voice call according to some embodiments.

FIG. 6 depicts an example of a voice call according to some embodiments. At 600, an input of audio data is received from call endpoint 104 of, "Hello, this is Aaron." At 602, a response is provided. For example, a supplemental word of "um" may be inserted before the response. Also, a supplemental word of, "hmm" may also be inserted in the middle of the response. The response may be, "Hi, um, Aaron, this is Kate from Company #1. Hmm, how can I assist you today? Do you have any questions about our custom t-shirts and sweatshirts?"

At 604, more audio data is received from call endpoint 104, such as, "Yes, I do. Can I actually talk to someone about this?".

At 606, a response is provided of "Hmmm, absolutely, Aaron! I can understand that sometimes it's easier to discuss products and options with someone directly. I can schedule a meeting for you with my colleague, Peter, who is an expert in our custom t-shirts and sweatshirts. Um, he will be able to assist you further and answer any questions you may have. Are you available on Mondays or Wednesdays between 9:00 AM and 3:00 PM?". In this case, a filler short sentence may be added, of, "I can understand that sometimes it is . . . ". Also, a simple word, of, "hmm" is added at the beginning of the response. Further, a filler word of "um" is added in the response. Adding these supplemental words masks delays and also makes the conversation more human like.

The use of supplemental words improves the voice call in multiple ways. For example, the voice call may mimic human conversations in a more natural way. Another improvement is the supplemental words mask out the delay caused by services that are performed in the voice processing. Humans may think intermittently while talking. This allows for supplemental words that mimic real human conversations to be inserted before a response, or in between sentences or within sentences, to mask out the unavoidable delays in performing services to generate the responses such that a user will not notice the delay.

The generation of supplemental words may be determined based on different needs, such as different types of delays. In some cases, enhanced call processing system 116 uses short-sentence mode supplemental words to cover longer delays, such as when the response sentence from a generative model is long and the model gateway will have to wait for an entire sentence or responses received to perform services, such as privacy check or toxicity check. In other cases, when the response is short, enhanced call processing system 116 may use more simple supplemental words that can be inserted before the response or within the response. The selection of the appropriate types of supplemental words is important to mimic the natural human conversation.

Accordingly, the more a user thinks they are talking to an automated bot, the likelihood of ending the call may be higher, or even if the users do not end the call, the willingness to engage may be lower. Having the voice responses bot speak more naturally can increase the effectiveness of the voice call.

Figure 7:
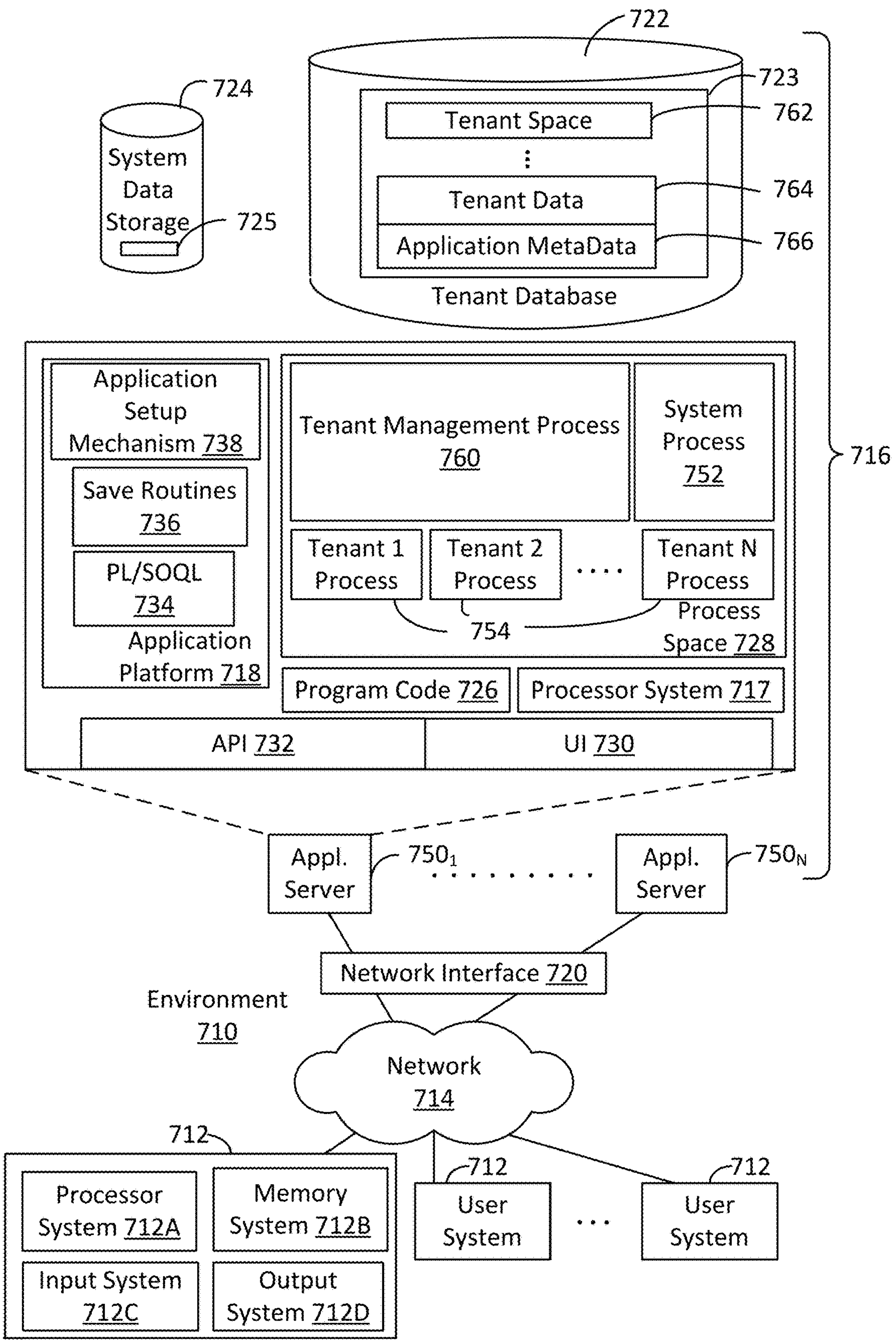
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based call processing system. For example, in some implementations, system 716 may include application servers configured to implement and execute call processing software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as enhanced call processing system 116, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, user follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a user with fields for basic contact information such as name, address, phone number, fax number, etc. Another table might describe a purchase order, including fields for information such as user, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to users that their multiple "tables" are in fact stored in one large table or that their data may be stored in the same table as the data of other users.

Figure 8A:
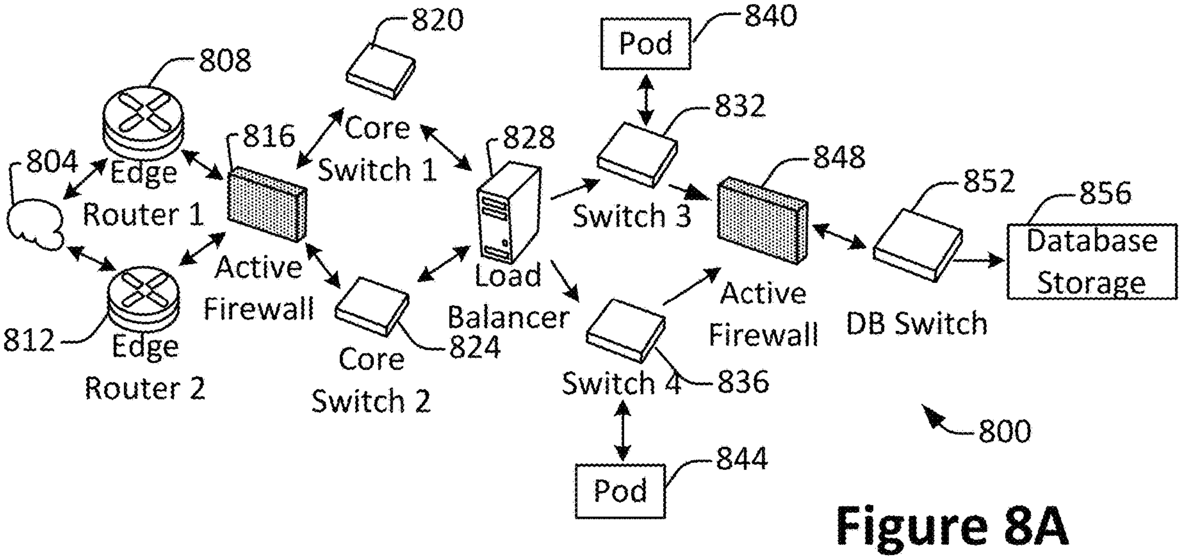
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process information for supplemental words.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
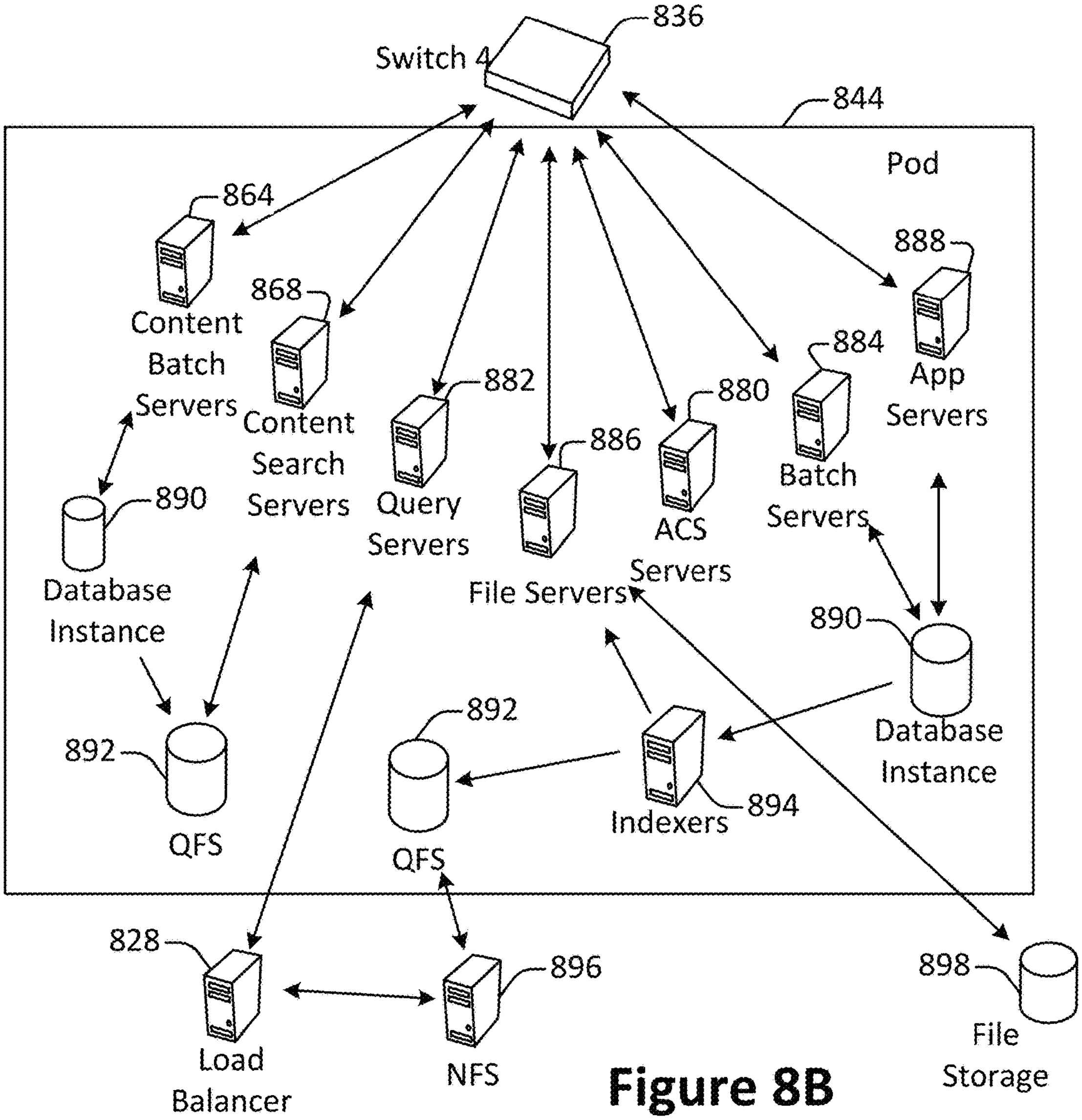
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular user, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
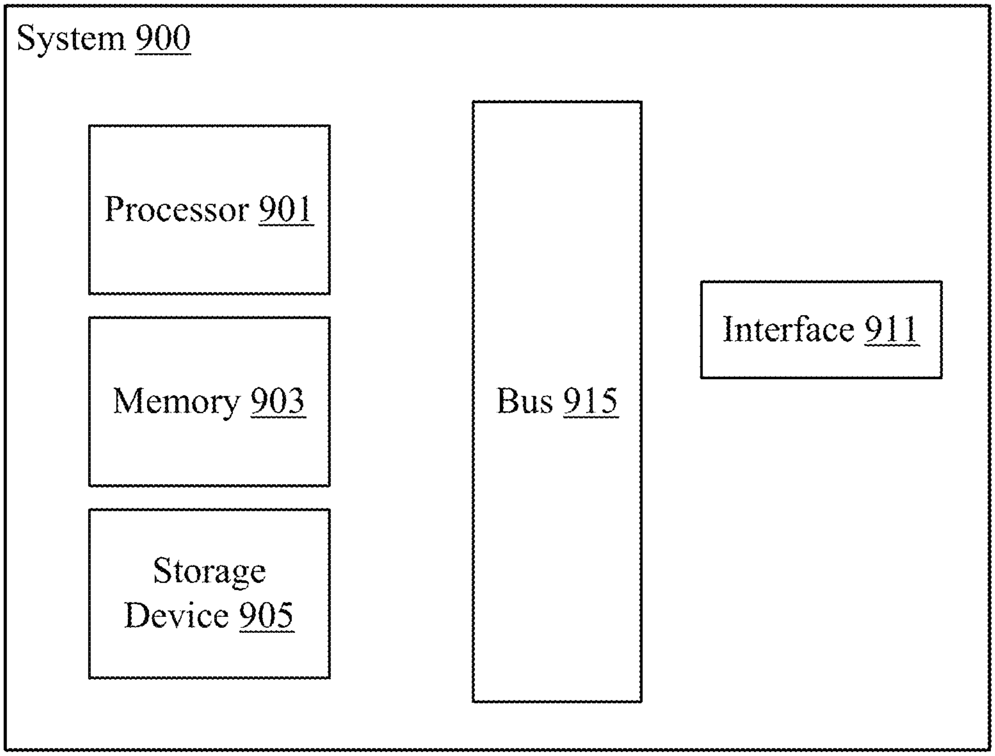
FIG. 9 illustrates one example of a computing device.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
- receiving audio data from a call;
- selecting a first type of service;
- selecting a second type of service;
- sending the audio data through a first application programming interface to the first type of service and through a second application programming interface to the second type of service to perform services including the first type of service and the second type of service to process the audio data to automatically generate a response, wherein the services include converting the audio data to input text, inputting the input text into a generative model to automatically generate a text response, and converting the text response to an audio response;
- selecting one or more supplemental words based on the input text;
- inserting a first supplemental word in a first position in the audio response based on selecting the first type of service;
- inserting a second supplemental word in a second position in the audio response based on selecting the second type of service; and
- providing the one or more supplemental words for insertion in the call at the first position and the second position to supplement the audio response.

2. The method of claim 1, wherein receiving audio data comprises:
- receiving the audio data from a call system via a first connection between the call system and a first endpoint, wherein the call system is connected to a call endpoint via a second connection.

3. The method of claim 1, wherein performing services comprises:
- converting the audio data to input text using a speech to text conversion;
- inputting the input text into the generative model to generate the text response; and
- converting the text response to the audio response using a text to speech conversion.

4. The method of claim 1, wherein performing services comprises:

inputting the input text into a first service to mask a portion of the input text to generate masked input text, wherein the masked input text is input into the generative model to generate a masked text response.

5. The method of claim 4, wherein performing services comprises:

inputting the masked text response into the first service to unmask a portion of the masked text response to generate an unmasked text response, wherein the unmasked text response is converted to the audio response.

6. The method of claim 1, wherein selecting one or more supplemental words based on the input text comprises:

analyzing the input text to determine a supplemental word type from a plurality of supplemental word types.

7. The method of claim 6, wherein analyzing the input text comprises:

determining an intent of the input text; and using the intent to select the supplemental word type.

8. The method of claim 7, wherein the intent is based on a question, a statement, or an emotion that is detected.

9. The method of claim 6, wherein selecting one or more supplemental words based on the input text comprises:

selecting from a group of supplemental words for the supplemental word type to select the one or more supplemental words.

10. The method of claim 9, wherein the selection is a random selection from the group of supplemental words.

11. The method of claim 1, wherein selecting one or more supplemental words based on the input text comprises:

analyzing the audio data to determine an intent that is used to determine a supplemental word type from a plurality of supplemental word types.

12. The method of claim 1, wherein determining the position comprises:

inserting the one or more supplemental words before the audio response is output.

13. The method of claim 1, wherein inserting the first supplemental word or inserting the second supplemental word comprises:

inserting the one or more supplemental words during the audio response.

14. The method of claim 13, wherein inserting the first supplemental word or inserting the second supplemental word comprises:

inserting supplemental words in the one or more supplemental words at multiple positions during the audio response.

15. The method of claim 13, wherein inserting the first supplemental word or inserting the second supplemental word comprises:

determining the first position or the second position based on a limitation of the first position or the second position is not at before a last word of a sentence or after an end of a sentence, and determining the first position or the second position based on a guideline of the first position or the second position is before the beginning of the sentence.

16. A non-transitory computer-readable storage medium having stored thereon computer executable instructions, which when executed by a computing device, cause the computing device to be operable for:

receiving audio data from a call;

selecting a first type of service;

selecting a second type of service;

sending the audio data through a first application programming interface to the first type of service and through a second application programming interface to the second type of service to perform services including the first type of service and the second type of service to process the audio data to automatically generate a response, wherein the services include converting the audio data to input text, inputting the input text into a generative model to automatically generate a text response, and converting the text response to an audio response;

selecting one or more supplemental words based on the input text;

inserting a first supplemental word in a first position in the audio response based on selecting the first type of service;

inserting a second supplemental word in a second position in the audio response based on selecting the second type of service; and providing the one or more supplemental words for insertion in the call at the first position and the second position to supplement the audio response.

17. The non-transitory computer-readable storage medium of claim 16, wherein receiving audio data comprises:

receiving the audio data from a call system via a first connection between the call system and a first endpoint, wherein the call system is connected to a call endpoint via a second connection.

18. The non-transitory computer-readable storage medium of claim 16, wherein performing services comprises:

converting the audio data to input text using a speech to text conversion;

inputting the input text into the generative model to generate the text response; and converting the text response to the audio response using a text to speech conversion.

19. The non-transitory computer-readable storage medium of claim 16, wherein performing services comprises:

inputting the input text into a first service to mask a portion of the input text to generate masked input text, wherein the masked input text is input into the generative model to generate a masked text response.

20. An apparatus comprising:

one or more computer processors; and a computer-readable storage medium comprising instructions for controlling the one or more computer processors to be operable for:

receiving audio data from a call;

selecting a first type of service;

selecting a second type of service;

sending the audio data through a first application programming interface to the first type of service and through a second application programming interface to the second type of service to perform services including the first type of service and the second type of service to process the audio data to automatically generate a response, wherein the services include converting the audio data to input text, inputting the input text into a generative model to automatically generate a text response, and converting the text response to an audio response;

selecting one or more supplemental words based on the input text;

inserting a first supplemental word in a first position in the audio response based on selecting the first type of service;

inserting a second supplemental word in a second position in the audio response based on selecting the second type of service; and providing the one or more supplemental words for insertion in the call at the first position and the second position to supplement the audio response.

* * * * *